US005453609A

United States Patent [19]

Gomez et al.

[11] Patent Number: 5,453,609

[45] Date of Patent: Sep. 26, 1995

[54] NON CROSS TALK MULTI-CHANNEL PHOTOMULTIPLIER USING GUIDED ELECTRON MULTIPLIERS

[75] Inventors: Javier Gomez, Newport News; Stanislaw Majewski; Andrew G. Weisenberger, both of Grafton, all of Va.

[73] Assignee: Southeastern Universities Research Assn., Inc., Newport News, Va.

[21] Appl. No.: 141,331

[22] Filed: Oct. 22, 1993

[51] Int. Cl.$^6$ .............................. H01J 43/18; G01J 3/38; G01J 3/50

[52] U.S. Cl. ................ 250/207; 250/208.6; 250/227.28; 250/239

[58] Field of Search ................................ 250/207, 208.6, 250/227.28, 239

[56] References Cited

U.S. PATENT DOCUMENTS 3,870,877 3/1975 Tolbird .................................. 250/239

3,947,841 3/1976 Tumolillo .............................. 250/207

*Primary Examiner*—William L. Sikes

*Assistant Examiner*—Fetsum Abraham

[57] ABSTRACT

An improved multi-channel electron multiplier is provided that exhibits zero cross-talk and high rate operation. Resistive material input and output masks are employed to control divergence of electrons. Electron multiplication takes place in closed channels. Several embodiments are provided for these channels including a continuous resistive emissive multiplier and a discrete resistive multiplier with discrete dynode chains interspaced with resistive layers-masks. Both basic embodiments provide high gain multiplication of electrons without accumulating surface charges while containing electrons to their proper channels to eliminate cross-talk. The invention can be for example applied to improve the performance of ion mass spectrometers, positron emission tomography devices, in DNA sequencing and other beta radiography applications and in many applications in particle physics.

16 Claims, 10 Drawing Sheets

NON CROSS TALK MULTI-CHANNEL PHOTOMULTIPLIER USING GUIDED ELECTRON MULTIPLIERS

The United States may have certain rights to this invention, under Management and Operating Contract DE-AC0584ER40150 from the United States Department of Energy.

FIELD OF THE INVENTION

This invention relates to multi-channel photomultipliers which are free from cross-talk. Typically multi-channel photomultipliers are plagued by some amount of cross-talk caused by electrons wandering to adjacent channel s.

BACKGROUND OF THE INVENTION

This invention provides a multi-channel photomultiplier free of cross-talk by providing a means to eliminate the transfer of electrons from one channel to another. Single photomultipliers have the advantage that they don't exhibit cross-talk. For economic reasons, one would like to pack many photomultipliers together to form a multi-channel photomultiplier. One of the problems with a multi-channel photomultiplier is that concomitant with obtaining high density is the problem of cross-talk between the individual channels.

At present there are several available types of multianode photomultipliers on the market, notably from Hamamatsu Photonics and Philips Components.

One new low cross-talk photomultiplier available commercially is the Philips XP1723. This photomultiplier contains a combination of a fiber optic window with an optimized dynode chain design with almost independent parallel operation of its 64 readout channels. To improve inter-channel separation the readout elements, dynode pads, are separated by small regions of "dead areas". However, even this photomultiplier, when low light levels are of the order of 10 photoelectrons or less per pulse, has a "confusion factor" of the order of $10^{-3}$ to $10^{-2}$. "Confusion factor" is defined here as the fraction of events allocated to wrong readout elements or pads after the signals are processed in the associated electronics and in a data analyzing computer. It is suspected that in this photomultiplier the cross-talk takes place mostly at the input stage between the photocathode and the first dynode and then in the dynode chain because the amplification dynode channels are not closed. As a result of the crosstalk, a center of gravity technique must be used to determine position. More importantly, the cross-talk prevents the use of this photomultiplier in a parallel mode with all the channels running independently and all at high rates. Another problem exhibited by the Philips XP1723 is its rather low quantum efficiency additionally compounded by poor transmission characteristics of its input fiber optic window.

In principle, there are other photodetectors that can be used to read many individual light channels but they have disadvantages which make their use difficult. Avalanche photodiodes lack enough amplification in a linear mode of operation to detect fast low amplitude signals from fibers. Avalanche photodiodes are also rather unstable, very sensitive to temperature and radiation and exhibit much noise. When used in a very high-gain Geiger amplification mode, with the gain above $10^7$, their rate capability is severely limited and they are very sensitive to radiation.

A solid state photomultiplier, Visible Light Photon

Counter (VLPC), is difficult to operate because it has to be kept at ≈7° Kelvin, and this introduces additional problems of coupling fibers to sensors.

An older structure which uses a low pressure gas as an amplifying element has lifetime problems as a result of the gases being incompatible with bialkali or multialkali photocathodes and the obtained amplification factors are low.

Hybrid photomultipliers with solid state elements were proposed in the 1960s and were recently reintroduced. Amplification is obtained by accelerating in a strong, 10 to 15 kVolt, electric field photoelectrons released at the photocathode and using them to bombard silicon diode active targets. Typical effective amplification factors of 2000 to 4000 are obtained with this method. In addition to silicon diodes, several other active elements were proposed, such as silicon drift chambers, silicon pixel arrays and avalanche diodes. Avalanche diodes add an additional amplification stage increasing the overall gain factor to $10^7$. Multichannel devices are in the process of being developed. The two main problems with a hybrid multianode device with an electrostatic amplifier are that the open, proximity focused geometry is vulnerable to the photocathode damage by ion feedback and that the active silicon element is sensitive to radiation damage. As a result, a relatively short lifetime can be expected.

Microchannel-based photomultipliers have also been built with external photocathodes. The existing devices suffer from count-rate and lifetime problems and are expensive. They also have the cross-talk problem because of the transversal movement of photoelectrons before they impinge on the microchannel plate. In one of the proposed novel designs dealing with this cross-talk effect, fibers are directly coupled, with no external photocathode, to the etched individual channels in a heavy metal oxide glass layer. One major problem with this design is the difficulty of making such a fiber-to-channel coupling scheme work with plastic fibers. Plastic fibers, due to their high air diffusion constant, are not compatible with the high quality vacuum, below $10^{-6}$ Torr, which is necessary for channel electron multipliers to operate. Another major problem with this design is that the efficiency of detection is expected to be very low as a result of the deposited photocathode material in the first section of the channel amplifier not being able to accelerate the photoelectrons sufficiently before impinging on the channel wall surface and, therefore, the secondary emission process will not take place.

U.S. Pat. No. 4,999,540 describes a stackable-dynode multiplier which is used in a single anode device and therefore is substantially different from a layered discrete guided electron multiplier designed for no cross-talk readout of many channels.

U.S. Pat. No. 3,240,931 describes an array of channel electron multipliers, however they are positioned to receive particles from a charged particle beam. No application with the array coupled to a photocathode to form a multi-channel photomultiplier is discussed.

In U.S. Pat. No. 4,937,506 the problem of electron divergence in the photomultiplier tube related to the issue of cross-talk is addressed by using focusing grid electrodes between the photocathode and the dynodes and/or between adjacent mesh dynodes and/or between the last dynode and the anode. However, this design is not completely cross-talk free as a result of the barriers between channels not being 100% impenetrable to electrons.

There are, in principle, several sources of cross-talk in multi-channel photomultipliers:

(1) photon cross-talk at the input window due to a photon beam spot size and divergence and to scattering of arriving photons; this effect can be minimized by using a fiberoptic faceplate window or individual focusing elements such as small spherical lenses outside the photomultiplier window or built into the photomultiplier window; additionally the window can be made of many small optical windows mounted in a holding window frame;

(2) photoelectron cross-talk with photocathode electrons traveling too far transversally and starting electron avalanches far away from the production point and even falling into "wrong" channels in the devices with discrete dynode structures;

(3) dynode electron cross-talk due to transversal electron avalanche growth encompassing more than one anode readout element (pad); this effect is mostly seen in discrete dynode structures with no limiting barriers or walls such as mesh dynodes;

(4) electron cross-talk at the anode readout elements; electrons emerging from dynode amplification chains can additionally spread transversally and be collected on several neighboring channels, pads, strips or wires; and (5) electronic cross-talk due to capacitive coupling and interchannel pickup, and also via the last common dynode.

SUMMARY OF THE INVENTION

A novel design of a multi-channel photomultiplier has been developed for reading scintillator detectors of different types and for potential use as photodetectors for positron emission topography (PET), for DNA sequencing utilizing scintillating fibers as active detector elements and for other applications needing a cross-talk free multi-channel photomultiplier. The design of this multi-channel photomultiplier replaces a discrete dynode chain with an array of independent guided electron multipliers made of closed wall channels with partly or totally resistive walls. The resistive walls can be either made of a resistive material or from insulator covered with a layer of a resistive material. Each channel is an independent electron amplifier and the overall design is optimized to completely eliminate channel-to-channel cross-talk. In the first basic embodiment of the present invention, the continuous guided electron multiplier, the electron channels are made of individual Channel Electron Multipliers. In an alternate embodiment, the discrete (discontinuous) guided electron multiplier, the channels are made of stacks of interspaced resistive and conductive plates with electron multiplication occurring on the surface of the conductive plates and the resistive plates closing the channel walls to guide or contain the electrons. This alternative basic embodiment is better adapted to a high rate, high current operation.

The resistive material mask may be incorporated into microchannel plate type electron multipliers to define fully isolated channels. An example of this would have input, output and inter dynode masks made of the resistive material. In this way microchannel plate type electron multiplier structures using microchannels could be utilized to develop cross-talk free multi-channel microchannel plate devices.

As a result of the novel features of this invention, the operation of a zero cross-talk multianode photomultiplier is possible. Linear amplification factors of at least up to $10^6$ can be obtained at rates of up to several MHz per channel.

OBJECTS AND ADVANTAGES

Accordingly, several objects and advantages of this invention are:

(1) to substantially improve upon existing commercially available multi-channel photomultipliers by completely eliminating channel to channel cross-talk;

(2) to provide linear amplification factors per channel of at least up to $10^6$ at rates of up to several MHz;

(3) to improve amplification and linearity of multichannel photomultipliers by eliminating charging up phenomena in the closed channels by using only resistive or conductive materials.

DESCRIPTION OF THE DRAWINGS

FIG. 22 is a view similar to FIG. 1 showing the use of an anode crossed wire readout.

DESCRIPTION OF THE INVENTION

Figure 1:
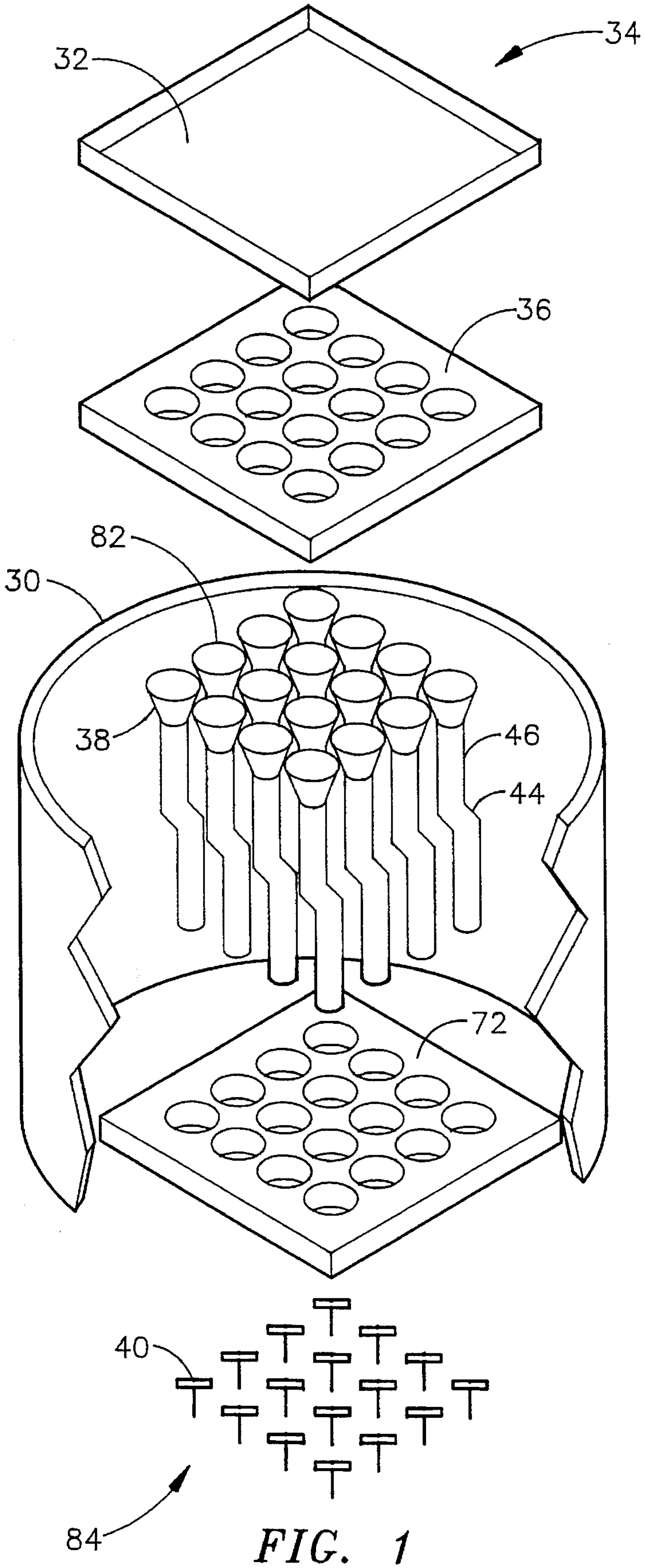
FIG. 1 is an exploded perspective schematic view of a first basic embodiment of the invention.

FIG. 1 basically represents the first basic embodiment of this invention, a multi-channel photomultiplier based on a continuous dynode structure. FIG. 1 depicts a vacuum envelope 30 surrounding the entire multi-channel photomultiplier. The multi-channel photomultiplier consists of, from the top of the figure to the bottom, a window 32 which contains on the inner side a deposited semitransparent photocathode 34, a resistive material input mask 36, sixteen channel multiplier 46, a kink or bend 44 in each dynode, and read out pads 40. The dynodes have a funnel (horn) shaped opening in the top end which is depicted as the funnels 38 in FIG. 1.

In operation, photons are converted to primary photoelectrons as they pass through the semi-transparent photocathode 34. The semi-transparent photocathode 34 consists of a window 32 that is typically constructed of either borosilicate, quartz, or ultraviolet glass, depending on the purpose and the frequency of the incident light. The actual material that produces the conversion of the photons to electrons is the coating on the underside of the window 32 which is typically bialkali or multialkali.

The photocathode 34, is normally called a semitransparent photocathode because it doesn't totally absorb the photons. Large fraction of photons will traverse the photocathode without being absorbed. There are no known materials to put on the entrance window that would totally absorb photons and that have a high probability of letting the photoelectrons escape, so that is why these photocathodes are called semitransparent photocathodes. Typically 25% of the incident photons are absorbed and converted into photoelectrons.

The second element, the resistive material input mask or element 36, acts as a separator between the photocathode 34 and the start of the multiplication channels. It provides a way to gain accelerating voltage. The photocathode 34 may be at ground potential or some other voltage, but there is provided a voltage difference between the start of the continuous channel multiplier 46 and the photocathode 34 and the input mask allows that voltage to be present and yet separates the channels, to avoid cross-talk.

The resistive material at the inlet must be sufficiently thick to permit the electrons to gain enough energy to cause secondary emission. A minimum thickness on the order of 1 mm will normally be required. The material must be sufficiently resistive to maintain the voltage gradient between the photocathode and channel multiplier. Neither a conductor or insulator would be satisfactory. Examples would be hydrogen treated lead glass and resistive ceramics such as $ZnTiO_3$. Typical resistances of the formed channels are in the range of $5\times10^7$ to $5\times10^9$ Ohm.

Next is depicted the channel multiplier 46 which have a funnel 38 as an integral part of their structure on the top or entrance end and a kink or bend 44 at some point along their length. Each funnel 38 enlarges the effective area for catching electrons that exit the resistive material input mask 36.

The relationship between the holes in the resistive material input mask 36 and the funnel 38 openings are that they match directly or are coincident one on top of the other.

Each separate path for the incident photons may be considered as a separate channel. Therefore, for example, FIG. 1 depicts a photomultiplier with 16 channels. Each channel may be considered as the opening in the resistive material input mask 36, the channel multiplier 46 including the funnel 38 and the kink or bend 44, and the corresponding opening in the resistive material output mask 72.

The channel multiplier 46 shown in FIG. 1 is a channel electron multiplier, which implies that the number of electrons that enter the separate channels are multiplied within the channel. This multiplication effect is created by coating the inside surface of the channel multiplier 46 with electron emissive material. The funnel 38 will be covered also by electron emissive material, which emits additional electrons from each impact by an incident electron. The funnel 38 may also be covered by photoemissive material, in addition to the emissive material, to increase the efficiency of photodetection. The input hole 82 of the funnel 38 is where the multiplication starts. The channel multiplier 46 is a continuous channel-tube, made out of resistive material which also, by itself, has secondary electron emissive properties.

Electrons that hit the wall of the individual channel multiplier 46, if they have gained sufficient energy, produce secondary electrons in the collision. Normally the collision of one electron will produce from 2 to 30 secondary electrons, depending on the materials and energy of the electron. A common term for this increase in number of electrons is the "electron avalanche". This avalanche continues until at the end of that tube where the output is a large net amplification or gain is obtained that corresponds to the original number of photoelectrons that were produced at the photocathode 34.

The resistive material output mask 72 near the exit end of the channel multiplier in some cases is required to separate the channel multiplier 46 from the collecting anode readout elements 40, especially if active anode elements are used. The resistive material output mask 72 may not be needed in the case that the anodes are passive and they are located directly at the end of the continuous line of the structure. The resistive material input mask 36 is always needed in this no cross-talk design but the resistive material output mask 72 is sometimes optional.

The funnel 38 has two purposes. The multiplication process, in those tubes, require that there be a relation between the inner diameter of the tube and the length of the tube, otherwise the electron does not suffer enough collisions to produce high gains. The funnel 38 allows the channel multiplier 46 to have a relatively small inner diameter while also allowing the dynode to have a larger collection area for gathering photons or electrons. In the latter case it will just be a resistive material. It may also be used, by covering the funnel 38 with a proper photocathode material, to increase the photoconversion efficiency.

As shown in FIG. 1, there also are a number of holes in the resistive material output mask or element 72. The diameter of these holes will approximate the size of the anode readout elements 40 rather than the inner diameter of the channel multiplier 46. The holes in the resistive material output mask 72 will usually be larger than the inner diameter of the channel multiplier 46 so that as the electrons exit the channel multiplier 46 there will be an angular divergence in the electrons that come out and one wants to maximize the catching of those electrons, especially if the anode 40 is not in immediate contact with the end of the channel multiplier 46.

The anode readout elements 40 are typically 2 to 5 millimeters (mm). The readout elements can be either passive such as metal pads or active semiconductive readout elements such as silicon PIN diodes or avalanche diodes. The diameter of the hole in the channel multiplier 46 is typically 1 mm with a minimum diameter of 0.1 mm and a maximum of 4 mm. The length of the dynode is typically from 5 to 100 mm, depending on the inner diameter. The inner diameter of the channel multiplier 46 and its length are chosen so that the electrons will have sufficient number of energetic collisions with the walls to allow the multiplication process to take place. The channel has a typical resistance of $10^8$ to $5\times10^9$ Ohm.

Figure 2:
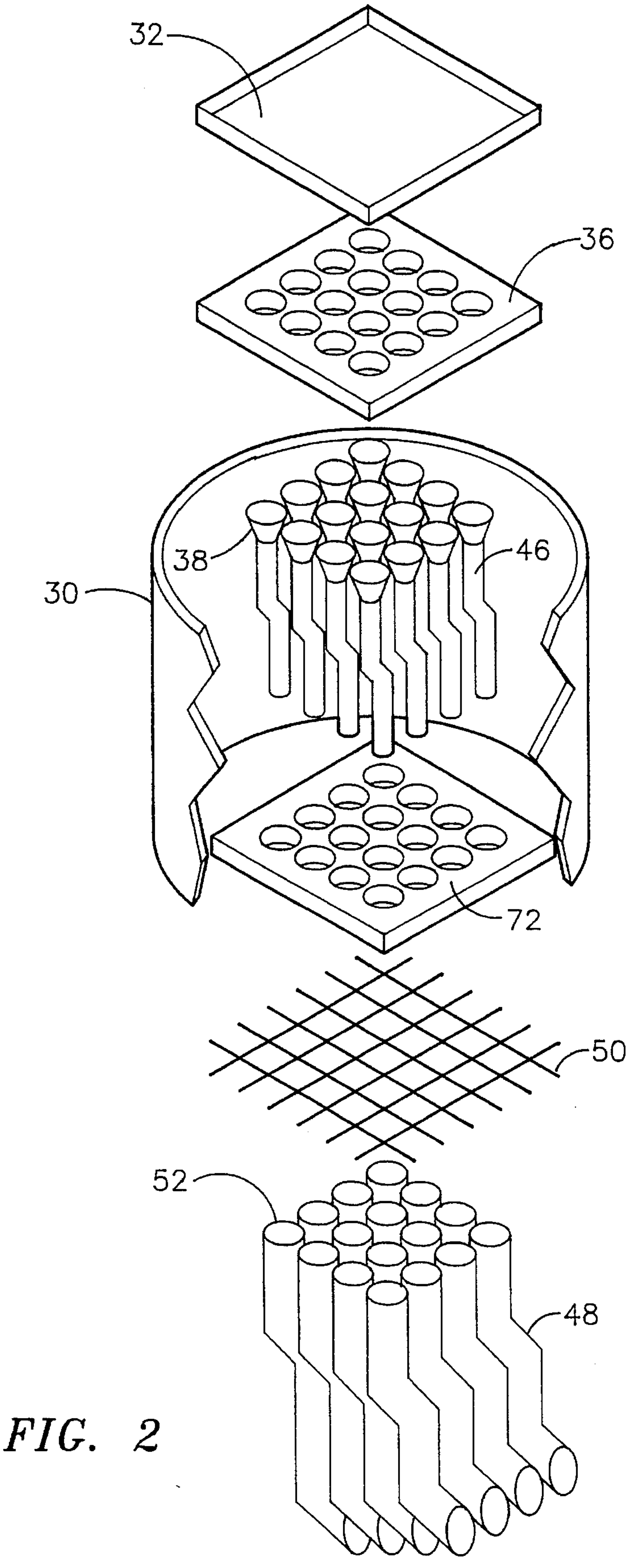
FIG. 2 is a view similar to FIG. 1 but using fiber optics rather than anode pad readout elements.

FIG. 2 shows a resistive material based electron multiplier 46 that is similar to that shown in FIG. 1 except the electron detection is accomplished with optical fibers 48 rather than anode pad or elements. The optical fibers 48 may be called optical anodes. At the output of the electron channel multiplier, the readout is achieved through optical fibers 48 that preferably have the top end, that is the end that is directly beneath the channel multiplier 46, coated with phosphor 52. The electrons strike the phosphor 52 and are converted into photons that are then transported by the optical fiber 48. This embodiment of the invention may be important in applications where it is desired that the signal be transported and read out optically. In this case the device operates as a multi-channel light amplifier.

The conducting grid to ground 50 depicted in FIG. 2 represents a method by which a space charge is carried off that might charge up the top of the fiber due to the electrons impinging on it. There are many ways that the space charge could be carried off, such as coating the fibers with a thin conductive layer and by having the tips of the fibers surrounded with some conductor, such as metal, and having that connected to ground. As the electrons exit the channel multiplier 46, a percentage of will hit the phosphor 52 and be converted to photons.

Figure 3:
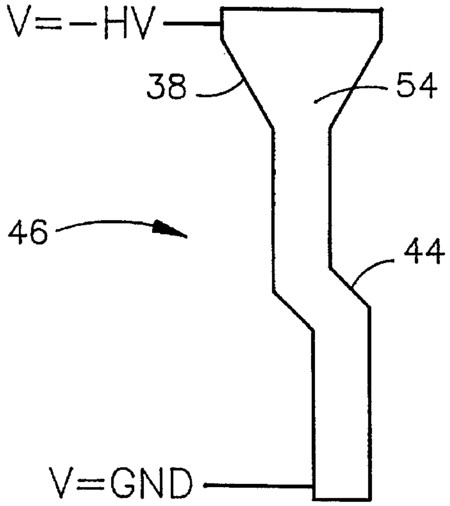
FIG. 3 is a cross-sectional view of a single continuous resistive electron multiplier shown in schematic form.

With reference to FIG. 3, the two lines to the left represent electrical connections that connect the individual channel to the circuit. In general applications, the mask 36, the photocathode 34, and the funnel 38 will be connected to an electrical circuit. A voltage differential provides a bleeding current through the resistive material so that charging problems do not occur and also to provide the accelerating voltage for the electrons to pass through the channel multiplier 46 structure.

FIG. 3 also shows the resistive material 54 that makes up the wall of the channel multiplier 46 and also the kink or bend 44 in the dynode. The end of the dynode opposite the funnel is connected to ground 86.

Figure 3A:
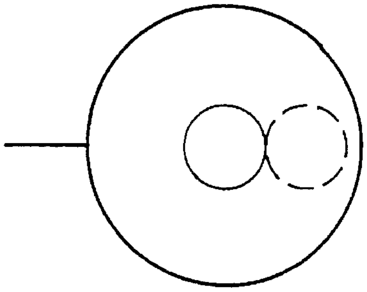
FIG. 3A and FIG. 3B are two alternative top views of FIG. 3.
Figure 3B:
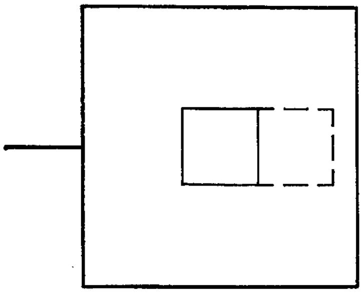

FIGS. 3A and 3B show the alternate shapes of the continuous resistive material based electron multiplier of FIG. 3. The funnel can be a circular shaped funnel as shown in FIG. 3A or a square shaped funnel as shown in FIG. 3B. As a result of the kink or bend 44 in the funnel, the exit of the funnel is shown offset from the center of the funnel at the top.

Figure 4:
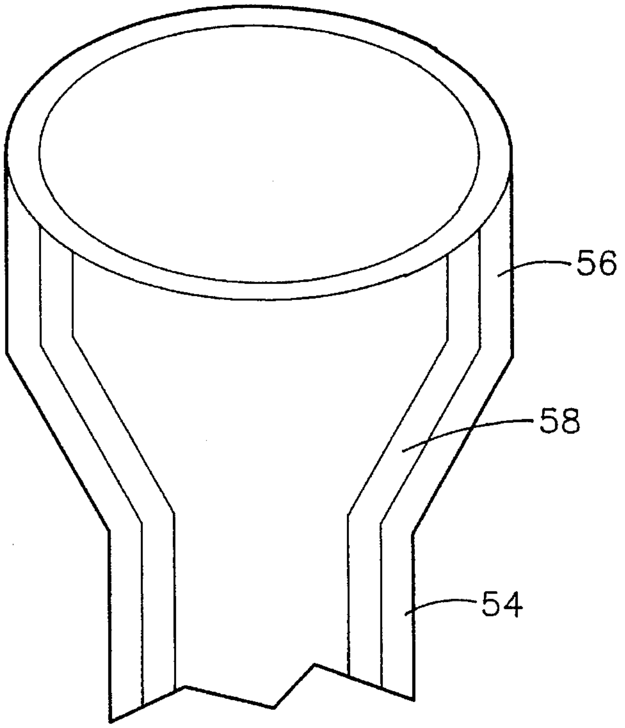
FIG. 4 is an enlarged schematic perspective view of the funnel or horn portion of FIG. 3.

FIG. 4 is a blown up cross sectional view of the funnel of FIG. 3 showing the inner surface at the entrance of the funnel 38. The surface may be coated with secondary emissive material 56 with or without the photo-emissive material 58. The emissive materials are deposited on the resistive material 54 that forms the channel multiplier 46. The resistive material 54 forms the wall or outer part of the funnel 38 and the inner darker region in FIG. 4 is the emissive material, either secondary emissive material alone or secondary emissive plus photo emissive material.

A photo emissive material will convert any photons that strike it into electrons, in the same manner that a photocathode does. Photocathodes are made up of photo emissive material. Examples of the most commonly used semitransparent photocathode materials are: cesium-antimony ($Cs_3Sb$), multialkali or trialkali ($Na_2KSb:Cs$), bialkali ($K_2CsSb$) and only recently available in the semitransparent form gallium-arsenide (GaAs). Secondary or electron emissive material converts electrons that strikes it into more electrons. In the case where both photo emissive and secondary emissive material are used, both photons and electrons that strike the material will be converted to more electrons.

A typical material that would have both photo emissive and secondary emissive properties would be cesium iodide. Other photocathode materials which also serve as secondary emitters as described in Burle Industries Photomultiplier 1989 Handbook, are $Cs_3Sb$, Rb—Cs—Sb, $K_2CsSb$, and $Na_2KSb:Cs$. The secondary emissive material that coats the interior of the funnel 38 could therefore be a two layer material or a single layer. But it has to have both of those characteristics, being both an emissive material as well as a resistive material.

Figure 5:
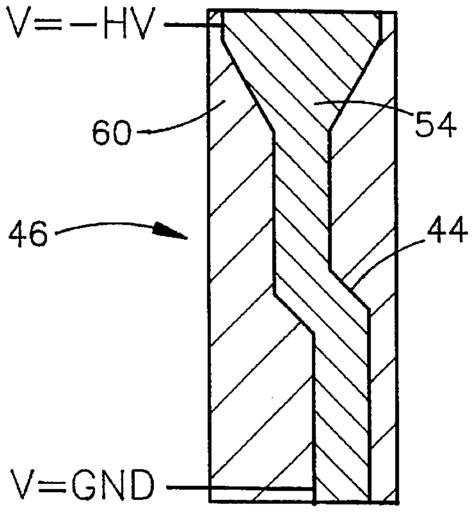
FIGS. 5, 5A, and 5B are views similar to FIGS. 3, 3A, and 3B except the channel is located in a solid body rather than being a discrete member.
Figure 5A:
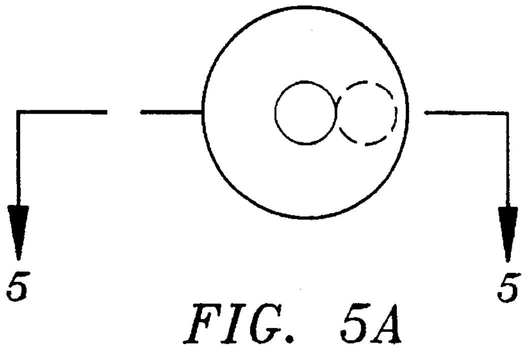
Figure 5B:
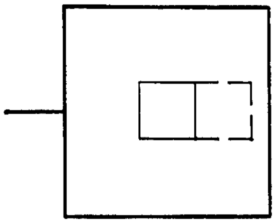

FIG. 5 is another embodiment of the multi-channel electron photomultiplier showing how a channel may be formed in a solid block as opposed to FIG. 3, which shows the individual tubes type structure. The channel may be formed, for example, in a block of resistive glass. The surface of the glass may be covered with a semiconductive layer of high secondary electron emissivity. The channel could be square or round, and by using a tortuous passage covered with proper material or using a block of proper material, such as resistive glass, the same function of obtaining an electron multiplication channel is achieved. FIG. 5 shows a solid body used for a channel multiplier 46 with the other elements such as the input resistive mask or element, output resistive mask or element, photocathode, anodes, etc., being the same as in FIG. 1.

The preferable method of constructing the solid block would be to form the holes in the solid body and coat the inner diameter of the holes with secondary emissive material or both secondary and photo emissive material. The material of construction of the block could be either resistive material or an insulating material coated with resistive material.

Figure 6:
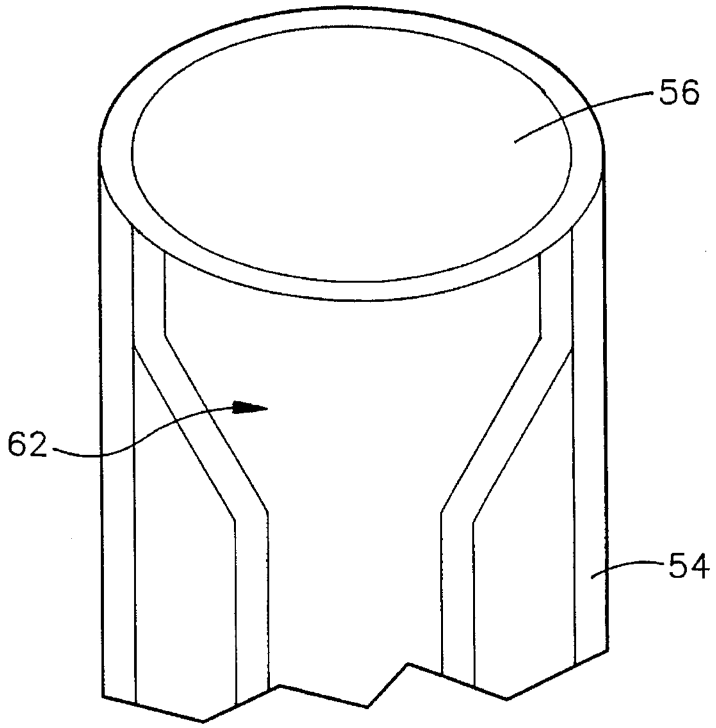
FIG. 6 is an enlarged schematic perspective view of the funnel portion of FIG. 5.

FIG. 6 depicts an enlargement of part of FIG. 5 showing the funnel 38 end of the solid body channel multiplier 46.

Figure 7:
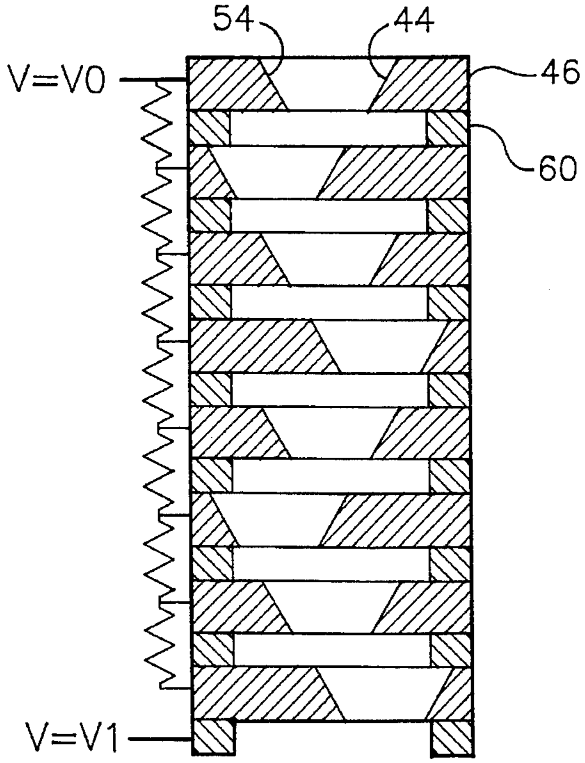
FIG. 7 shows a cross-sectional schematic view of another embodiment of this invention, a discrete electron multiplier.

FIG. 7 shows the second basic embodiment of this invention. Instead of a continuous electron multiplier it shows a discrete electron multiplier which basically consists of stacked discrete dynodes 66 to prevent ion feedback having funnel shaped openings coated with secondary emissive materials 64 commonly offset from the one above to prevent ion feed-back and separated by a resistive material mask or element 68 in between such that a potential can be created between dynodes and at the same time the resistive material mask has holes that form a channel that does not allow electrons to migrate to neighboring channels.

Operated as a single channel, the discrete resistive material based multiplier shown in FIG. 7 would have the advantage of being able to carry higher current than a channel multiplier channel such as one of the channels depicted in FIG. 1. It should also have a longer life time. This kind of stack of dynodes interspersed with the resistive material masks form a closed channel that prevents electrons from spreading but also reduces the problem of resistive material changing its properties during operation. The amount of change in the resistive properties is dependent on the current at which the device is run.

As to an individual channel, each discrete dynode layer has a funnel shaped structure. It is a discrete dynode 66 with either a secondary emissive surface 64 or the discrete dynode itself could have secondary emissive properties. The body of the discrete dynode 66 would typically be constructed of a conductor such as copper-beryllium alloy, which is a secondary emissive material. The discrete dynode could also be covered, especially in the first dynode stages, by a secondary emissive material such as cesium iodide, which has a much higher secondary emission coefficient. Having a higher emission coefficient, cesium iodide would produce more electrons out of one incident electron than would be produced with standard copperberyllium alloy material. The discrete dynode 66 could also be another conductive material, typically a metal, activated or coated with a secondary emissive material to give it secondary emissive characteristics. The thickness of the secondary emissive layer will be typically less than a micron. In the channel electron multiplier the diameter of the bottom of the cone or funnel would typically be 100 to 500 microns. The shape of the funnel within the discrete dynode 66 makes the top of it a little broader than the bottom. The angle of the funnel is typically 25°–75°. The position of the funnel in every second dynode or in some dynodes in the stack can be offset or shifted as mentioned to let no ions produced in the residual gases present in the device to drift back to the photocathode. This is to protect the photocathode from damage by ions and is equivalent to the kink 44 present in the continuous structures in FIGS. 3 and 4. It might be necessary to shape the channel surface differently than shown in FIG. 9 to optimize electron amplification and transport in the channel. In the simplest version the kink 44 will be reproduced in the discrete structure as shown in FIG. 7. The thickness of the resistive material mask 68 layer would typically be between 0.5 mm to 3 mm. Many different materials and other resistive mask shapes and forms are possible with the only main requirement that the surface of the mask exposed to the electrons should be resistive to avoid charging up of the channel surface.

The conductors that lead out of each dynode layer are tied together electrically with each layer having a different voltage potential on it from the layer above it, by a resistive chain or some voltage divider circuit so that there is a voltage gradient from the entrance to exit of each channel multiplier. In most applications if several parallel channels are used, each corresponding individual layer could for simplicity share the same voltage.

Figure 8:
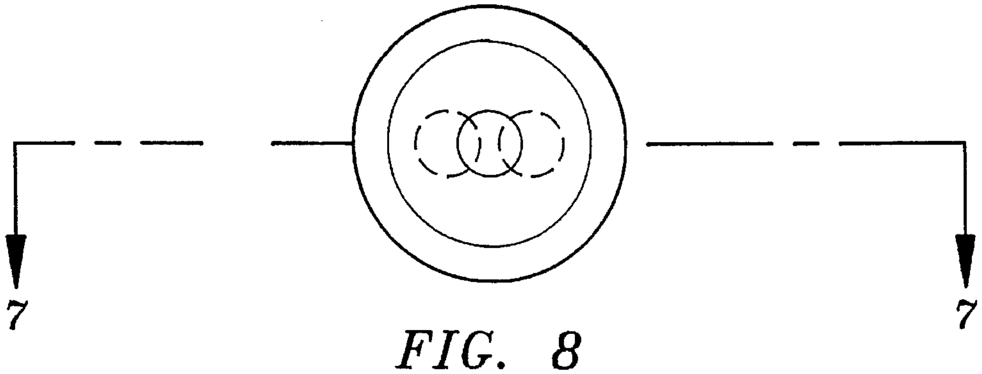
FIG. 8 shows the top view of the embodiment shown in FIG. 7 when it is constructed as a circular shaped channel.
Figure 9:
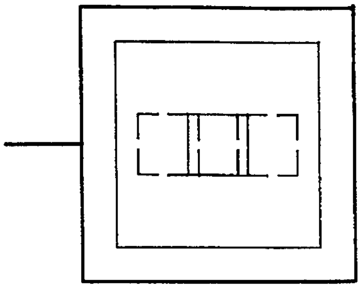
FIG. 9 shows another top view of the embodiment shown in FIG. 7 when it is constructed as a square or rectangular shaped channel.

In practice, a typical multi-channel electron multiplier constructed of the discrete resistive material based channels, would typically have about 10 to 30 separate layers. Each of these layers produces part of the gain of the channel. The individual channels can be circular or square as shown in FIGS. 8 or 9.

Figure 11:
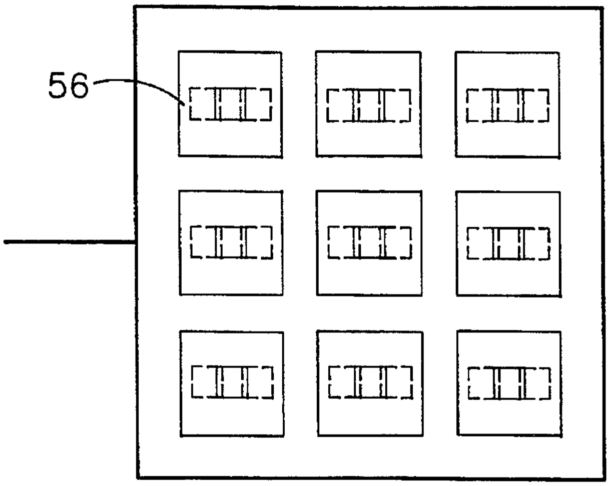
FIG. 11 shows a top view of the embodiment of FIG. 10 in which both the single channel of the discrete resistive material based electron multiplier and its subchannels are circular shaped.
Figure 12:
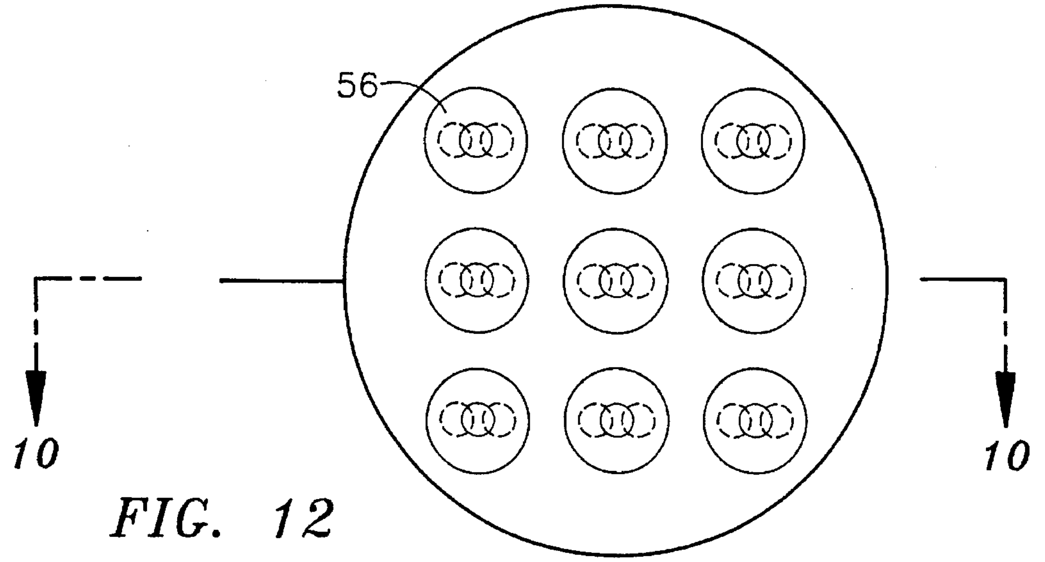
FIG. 12 shows a top view of the embodiment of FIG. 10 in which both the single channel of the discrete resistive material based electron multiplier and its subchannels are square or rectangular shaped.

When the discrete devices are put into an arrangement forming several channels, each layer would typically be constructed of a plate with holes in it to form the individual channels, as shown in FIGS. 11 and 12. Both the discrete dynodes 66 and the resistive material masks 68 are typically formed of plates with holes punched, etched or machined in them. When assembled and put into a glass envelope, a discrete multi-channel electron multiplier is produced. The plates can be circular or square shaped as shown in FIGS. 11 and 12. The funnel itself may be circular or square shaped as shown in FIGS. 8 and 9 or 11 and 12.

Figure 10:
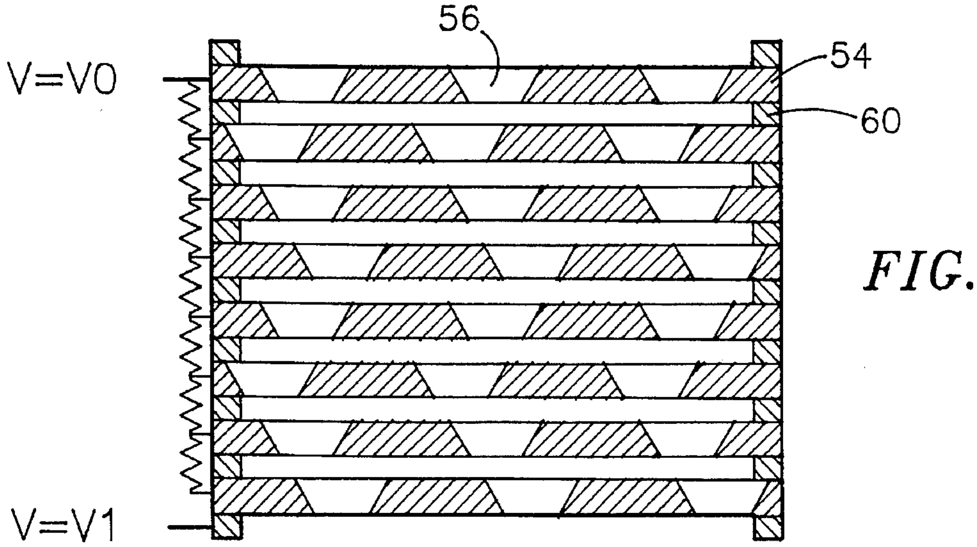
FIG. 10 shows a cross-sectional schematic view of another embodiment of the present invention in which a single channel of the discrete resistive material based electron multiplier utilizes a subchannel plate type dynode structure. A nine subchannel example is shown.

FIG. 10 shows an example of another embodiment of the present invention in which a single channel of the discrete resistive material based electron multiplier utilizes a subchannel plate type dynode structure. In FIG. 10, the input mask would look exactly the same way as the resistive material separators 68. In the case of FIG. 10, one active channel would be built in this case of nine subchannels. Other possible numbers of subchannels are: 4, 16, 25, and many other depending on the shape and size of each active channel. This is a single channel broken into a series of subchannels which has the advantage of providing more uniform and higher gain. The bottom hole of each funnel shaped opening is small to provide a high probability of the electrons hitting the dynode surface and minimize ion feedback, but it has to be large enough to allow the secondary electrons to pass to the next dynode stage.

In the discrete electron multiplier shown in FIG. 7, with only one small hole per channel, the channel will have only a small area of acceptance. This arrangement is limited to a certain size of fiber or photocathode. By having many of the holes, such as in the subchannel arrangement shown in FIG. 10, and putting the wall of the resistive material separators farther out, the size of the holes can be made larger which increases the acceptance area and therefore provides higher gain. By adopting the subchannel architecture, the individual channels can be broadened so that the receptor, anode or fibers, can be bigger, typically in the range of 0.5 mm to 3 mm but possibly to as large as 10 mm. The resistive material separators or masks 68 would not be limited to the subchannel hole. Additional advantage of this technique is that different sizes of channels can be obtained from the same basic subchannel structure. Again the dynode structure is shown to be offset to prevent ion feed-back.

Figure 13:
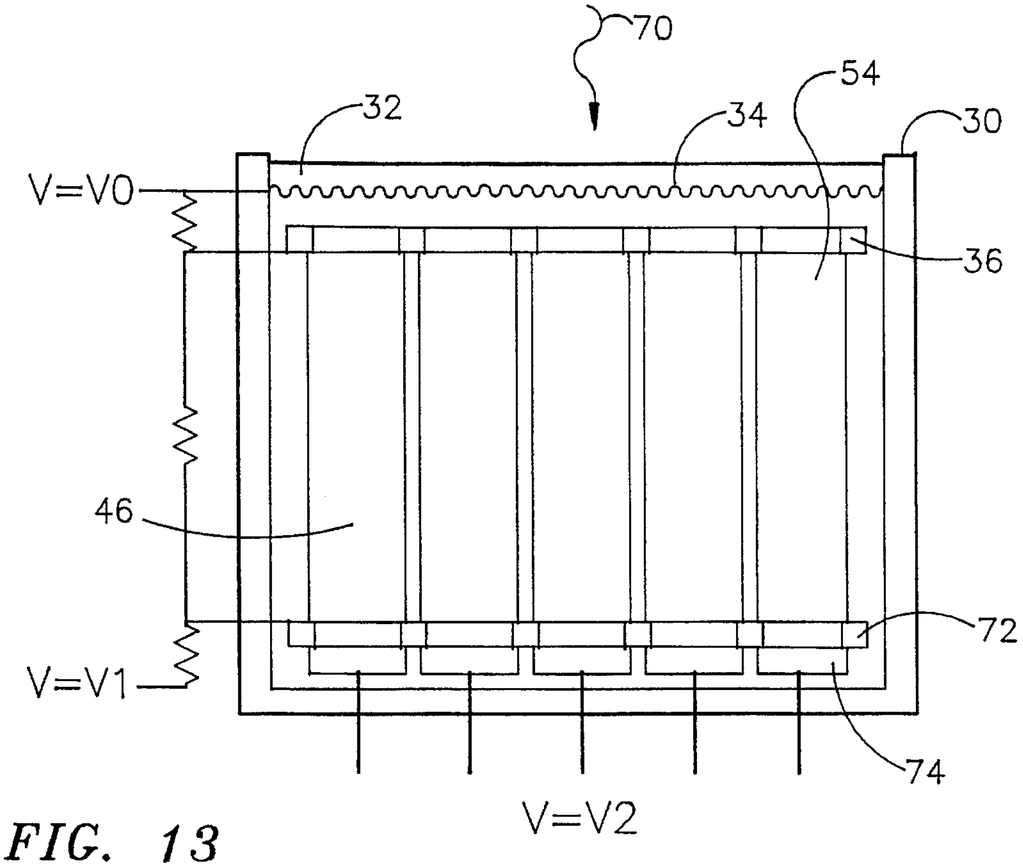
FIG. 13 is a cross-sectional schematic view which depicts the use of the multi-channel electron multiplier as a photomultiplier including the vacuum envelope.

FIG. 13 is a cross sectional view depicting the use of the multi-channel electron multiplier as a photomultiplier including the vacuum envelope 30. Photons 70 impinge at the top on an optically transparent window 32 which is coated on the underside with a photocathode material 34. The window can be either a one piece of a transmitting material such as glass or quartz, or can be subdivided into a number of small windows, one per each channel. The whole window or the small channel windows can be made from a continuous optical material such as glass or can be formed as a fiber optic window to limit transversal spread of photons and the optical cross talk as discussed before. The resistive material input mask 36 is located at the mouth of the channel multiplier 46, which is shown schematically as a generic rectangular shape. At the exit of the multiplier 46 the resistive material output mask 72 is coupled to the readout element 74. The readout element may be either a passive or an active anode. The multiplier 46 are based on resistive materials electron multipliers, either continuous or discrete. This view shows the entire concept, the multichannel photomultiplier.

A pin or wire is connected to ground at the bottom. Another pin or a wire at high voltage is connected at the top of the structure.

Figure 14:
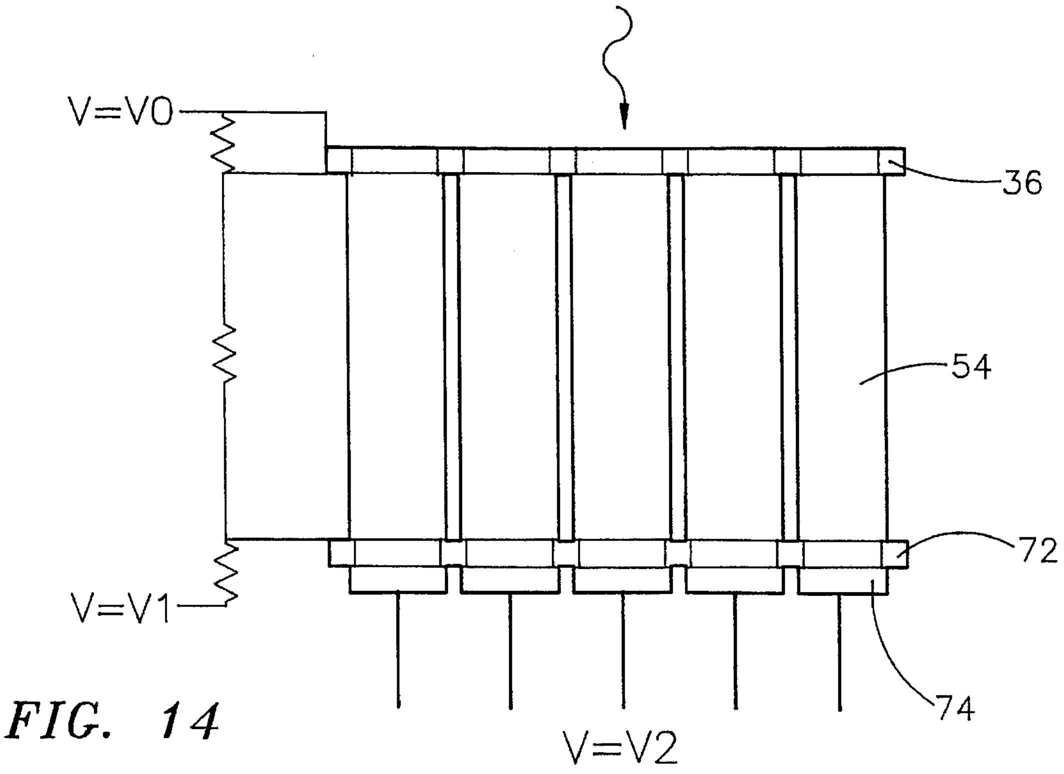
FIG. 14 is a cross-sectional schematic view which depicts the use of the multi-channel electron multiplier in applications where electrons, ions, or high energy photons produce secondary emissions directly and a separate photocathode is not needed.

When detecting high energy particles such as electrons, ions, and high energy photons, which can trigger off the secondary emissive materials directly, the use of a photocathode is not necessary as shown in FIG. 14.

Figure 15:
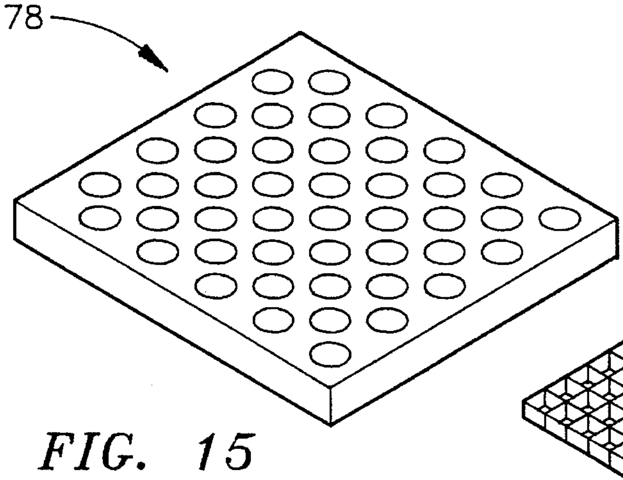
FIG. 15 and FIG. 16 depict possible designs of resistive material input or output masks, showing circular channels in FIG. 15 and square or rectangular channels in FIG. 16.
Figure 16:
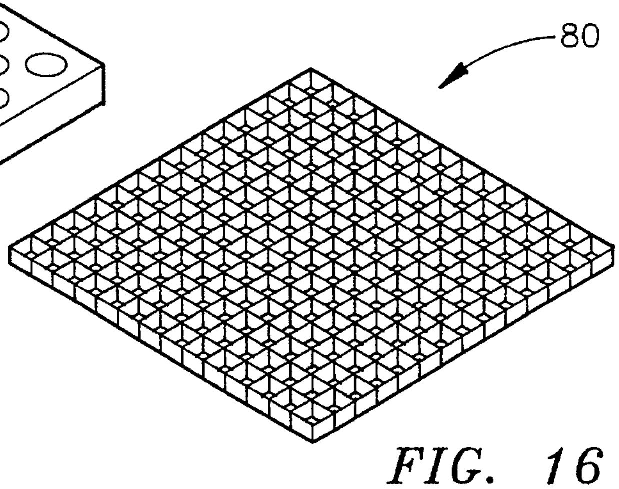

FIG. 15 and FIG. 16 show two other examples of possible resistive material masks, either an input mask or output mask. These masks can also be envisioned as the discrete masks that are sandwiched between the discrete conductive dynodes. FIG. 15 shows an example of a circular channeled material mask which is used when matching up with circular channels. FIG. 16 shows an example of a square channeled material mask which is used when matching up with square channels.

Figure 17:
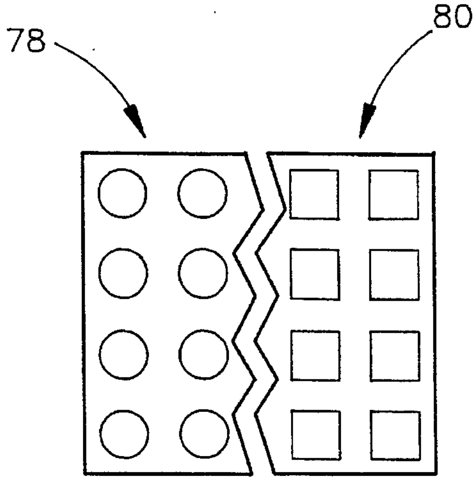
FIGS. 17, 17A and 17B depict a top cutaway portion of examples of possible shapes for the channeled resistive material mask.
Figure 17A:
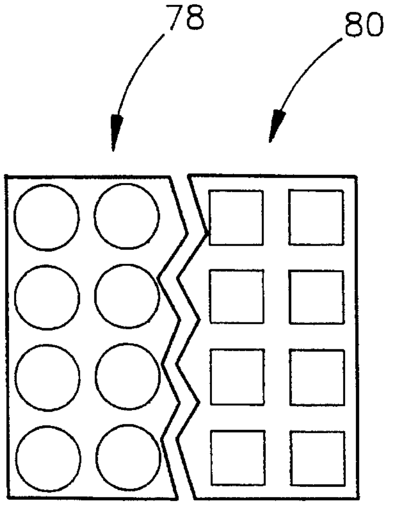
Figure 17B:
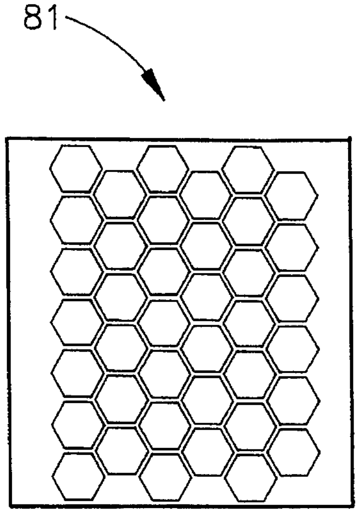

FIG. 17 shows a top view of the circular channels shown in FIG. 15 and a top view of the square channels shown in FIG. 16. FIGS. 17A and 17B show other variations of the shape and packing arrangements of the channels including hexagonal shape 81. Shown are possible denser packing arrangements which will reduce dead space.

The left side of FIG. 17 depicts a top cutaway portion of the circular channeled resistive material mask 78 shown in FIG. 15. The right side of FIG. 17 shows a top cutaway portion of the square channeled resistive material mask 80 shown in FIG. 16. Circular, square, hexagonal or rectangular holes may be used to form the channels in the resistive material masks.

Figure 18:
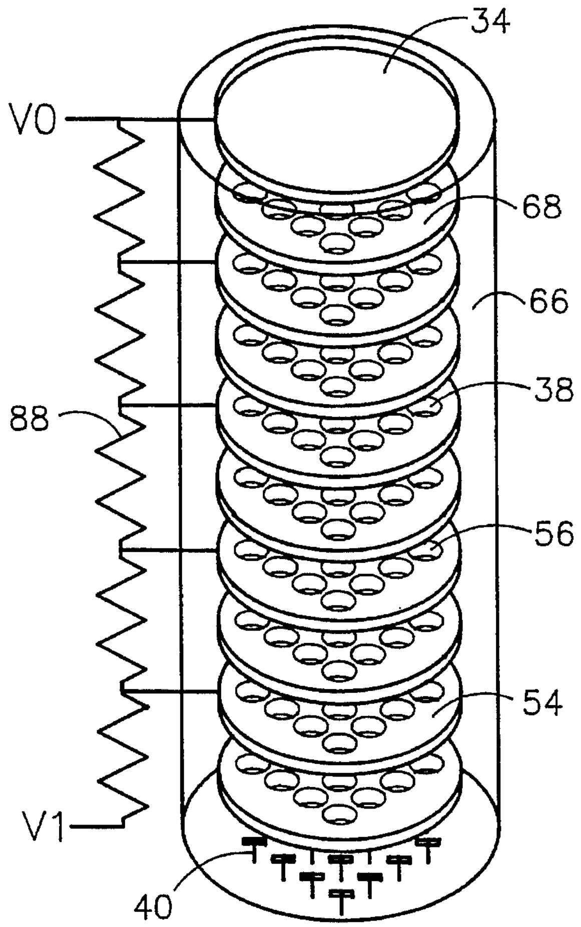
FIG. 18 is an exploded view of a sixteen channel discrete electron multiplier with circular funnels in circular shaped discrete dynodes and circular channels in circular shaped resistive masks.

FIG. 18 is an exploded schematical view of a sixteen channel discrete electron multiplier with circular funnels in circular shaped discrete dynodes and circular channels in circular shaped resistive masks. The multi-channel discrete electron multiplier may be sixteen channels as shown in this depiction or any number of channels that is desired. In this case, sixteen channels are provided with sixteen read out pads 40.

The multi-channel discrete electron multiplier shown in FIG. 18 consists of five separate resistive material separators/masks 68 which keep the electrons from spreading and jumping to adjacent channels.

The multi-channel discrete electron multiplier shown in FIG. 18 also contains four separate discrete dynodes 66 between the resistive masks 68. The discrete dynodes 66 in this arrangement contain circular shaped funnels 38. The discrete dynodes 66 may be constructed simply of a secondary emissive material such as a cesium activated copper-beryllium alloy that acts to multiply the number of electrons traveling through the multiplier. The interior conical surface of the funnels 38 could also be coated with a secondary emissive material 56 with a higher secondary emission yield, such as cesium iodide or GaP:Cs, on top of the copper beryllium alloy or other dynode material to increase the rate of electron multiplication.

FIG. 18 shows a voltage divider circuit which is connected to the photocathode 34 and each discrete dynode 66 layer. Resistors 88 drop the potential from layer to layer to provide voltage drops across the multi-channel discrete electron multiplier. Typical value of the voltage drop is 50–200 Volt. This provides a potential to accelerate electrons as they are increased in number by collisions with the secondary emissive material 56 within the channels. The voltage division could also be achieved by using divider circuits using Zener diodes, transitors and resistors alone or in combination depending on the application. The read out pads 40 collect the electrons as they exit the last resistive material layer/mask 68.

In FIG. 18, the multi-channel discrete electron multiplier is shown constructed with circular channels in the resistive layers 68 and circular funnels 38 in the discrete dynode 66 layers. The outer shape of the resistive layers 68 is circular and the outer shape of the discrete dynode 66 layers is circular.

Figure 19:
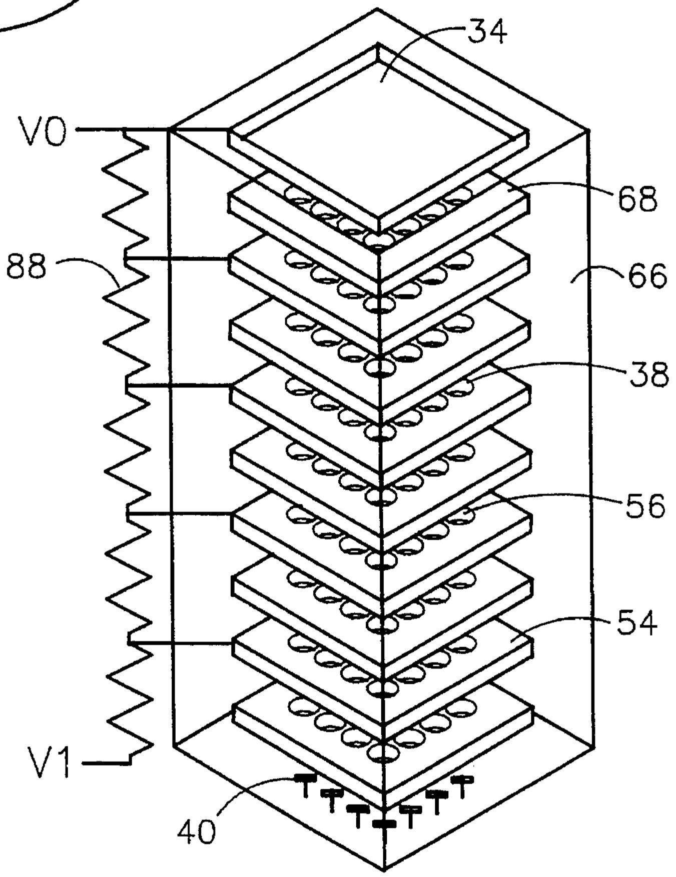
FIG. 19 is an exploded view of a sixteen channel discrete electron multiplier with circular funnels in square shaped discrete dynodes and circular channels in square shaped resistive masks.

FIG. 19 is an exploded schematical view of a sixteen channel discrete electron multiplier with circular funnels in square shaped discrete dynode 66 layers and circular channels in square shaped resistive mask layers 68.

FIGS. 18 and 19 demonstrate that the outer shape of the discrete dynode layers and resistive mask layers can be any shape that is desired for the particular application. The circular channels in the resistive masks and the circular funnels in the discrete dynode layers depicted in FIGS. 18 and 19 could alternately be constructed as square channels in the resistive masks and square funnels in the discrete dynode layers.

Figure 20:
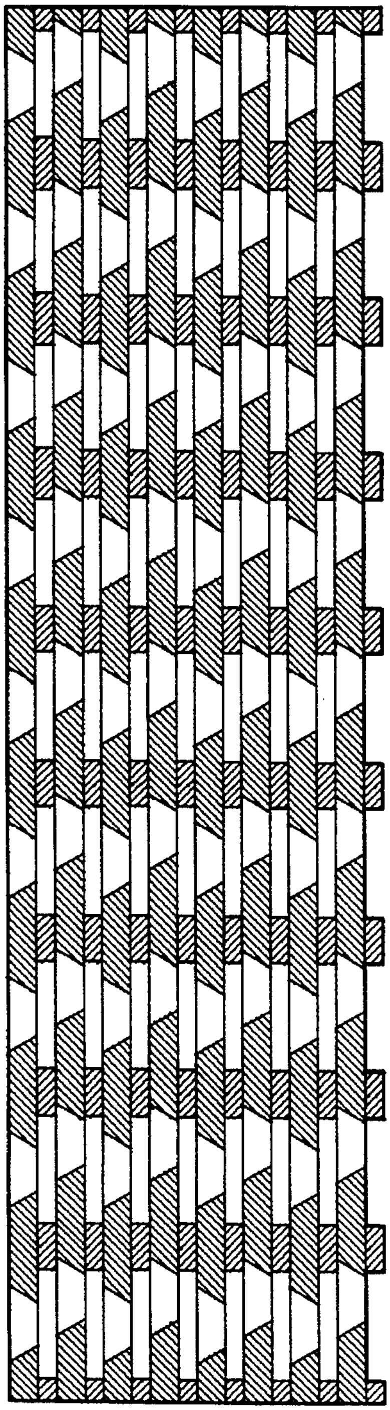
FIG. 20 is a view of a dynode structure with subchannels which is extended and the individual channels are defined by the resistive masks.
Figure 21:
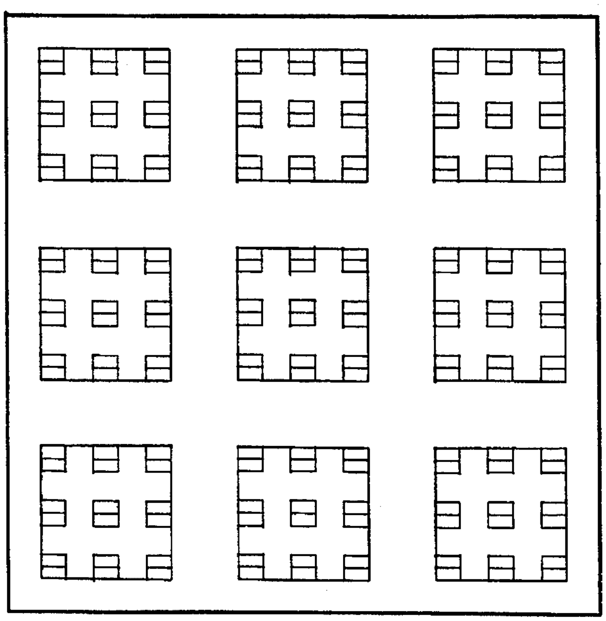
FIG. 21 is a top view showing how the large area of subchannels is divided up into channels by the resistive mask.

FIG. 20 is a schematic showing a variation of the offset dynode structure which is made up of a large area of subchannels and the individual channels are defined by the resistive masks. FIG. 21 is a top view showing how the large area of subchannels is divided up into channels by the resistive mask.

With reference to FIG. 22, the collection of the electrons following the output resistive mask after final electron multiplication can be achieved by two seperate planes of anode wires that are orthogonal to each other. This method is referred to as "anode crossed wire readout". In this manner the location of the channel with a signal is ascertained by determining the x and y location. This technique is used by Hamamatsu in some of their multichannel photomultiplier tubes. If needed an additional resistive mask stage could be added following the anode wires to insure no cross-talk. This method greatly reduces the number of electronic readout channels as opposed to individual anode pads for each channel and is appropriate for applications which do not require a high level of occupancy.

Many modifications and variations of the present invention may be made in the light of the teachings herein. It is therefore to be understood that within the scope of the appended claims the invention may be practiced otherwise than specifically described.

What is claimed is:

1. A non cross-talk multichannel electron multiplier radiation detector comprising:

an evacuated container;

a multiplicity of parallel electron channel multipliers adjacent to one another with each channel multiplier having an interior surface and an entrance end and an exit end with all of said entrance ends lying in substantially the same entrance plane and all of said exit ends lying in substantially the same exit plane;

a substantially planar resistive element having a plurality of openings across the thickness thereof with one of said openings aligned with and adjacent to each of said entrance ends of said channel multipliers;

a secondary electron emissive material associated with said interior surface of each of said channel multipliers; a readout element located at said exit end of each of said channel multipliers; and an electric circuit creating a voltage difference between said resistive element and said exit ends of said channel multipliers to accelerate and multiply electrons from said entrance ends to said exit ends.

2. The radiation detector of claim 1, which further includes a substantially planar output resistive element having a plurality of openings across the thickness thereof, with one of said openings aligned with and adjacent to each of said exit ends of said channel multipliers.

3. The radiation detector of claim 1 which further includes a substantially plannar photo emissive element overlying said resistive element whereby at least some of the photons striking said photo emissive element are converted into electrons.

4. The radiation detector of claim 1, wherein said openings in said resistive element have substantially the same diameter as said entrance end of said channel multipliers with said entrance end being funnel shaped with the large end of the funnel being adjacent to said resistive element.

5. The radiation detector of claim 1, wherein said multiplicity of channel multipliers are arranged as stacked layers of alternating resistive material elements having a plurality of openings and dynode layers having said plurality of channels with all of the openings in said resistive material layers and channels in said dynode layers being substantially in alignment with respect to one another from said entrance end to said exit end of each channel and with said electric circuit creating a voltage gradient from the outermost pair of a resistive material layer and dynode layer adjacent the said entrance end to the innermost pair of resistive material layer and dynode layer near said exit end.

6. The radiation detector of claim 5 wherein the channels in adjacent dynode layers are offset with respect to one another to form a tortuous electron channel multiplier from said entrance end to said exit end.

7. The radiation detector of claim 6 wherein the channels of each of said dynode layers has a funnel shaped entrance with the entrance portion of the funnel diverging toward said entrance end.

8. The radiation detector of claim 5 wherein each of said channels in each of said dynode layers is formed into a multiplicity of funnel shaped sub-channels with the mouth of said funnel shaped sub-channels diverging in the direction of said entrance end, and with the sub-channels in adjacent dynode layers being offset with respect to one another.

9. The radiation detector of claim 1 wherein said electron channel multipliers are continuous electron channel multipliers.

10. A radiation detector comprising;

an evacuated container;

an electron channel multiplier having an entrance end and an exit end;

a resistive element having an opening coincident with and near the entrance end of said channel multiplier;

an electron secondary emissive material associated with the interior surface of said channel multiplier;

a read out element located at said exit end of said channel multiplier; and an electric circuit creating a voltage difference between said resistive element and said exit end of said channel multiplier to accelerate and multiply electrons from said entrance end to said exit end.

11. The radiation detector of claim 10, wherein said channel multiplier is arranged as a stack of alternating resistive material layers having openings therein and dynode layers having openings therein with said resistive material layer openings and dynode layer opening defining a channel with the openings in said resistive material layers and said dynode layers being substantially in alignment with respect to one another from said entrance end to said exit end of the channel multiplier and with said electric circuit creating a voltage gradient from the outermost pair of a resistive material layer and dynode layer adjacent said entrance end to the innermost pair of a resistive material layer and dynode layer near said exit end.

12. The radiation detector of claim 11 wherein the openings in adjacent dynode layers are offset with respect to one another to form a tortuous channel multiplier from said entrance end to said exit end.

13. The radiation detector of claim 12 wherein the opening of each of said dynode layers has a funnel shaped entrance with the entrance portion of the funnel diverging towards said entrance end.

14. The radiation detector of claim 13, which further includes a substantially planar output resistive element having an opening across the thickness thereof, with said opening aligned with and adjacent to said exit end of said channel multiplier.

15. The radiation detector of claim 13 which further includes a substantially planar photoemitter element overlying said resistive element whereby at least some of the photons striking said photo emissive element are converted into electrons.

16. The radiation detector of claim 12 wherein said opening in each of said dynode layers is formed into a multiplicity of funnel shaped sub-channels with the mouth of said funnel shaped sub-channels diverging in the direction of said entrance end, and with the sub-channels in adjacent dynode layers being offset with respect to one another.

* * * * *